United States Patent [19]

Bergmann et al.

[11] 4,389,216
[45] Jun. 21, 1983

[54] NAVY DYE MIXTURES

[75] Inventors: Udo Bergmann, Darmstadt; Helmut Degen, Frankenthal; Guenter Hansen, Ludwigshafen; Reinhold Krallmann, Weisenheim; Wolf-Dieter Kermer, Fussgoenheim, all of Fed. Rep. of Germany

[73] Assignee: BASF Aktiengesellschaft, Ludwigshafen, Fed. Rep. of Germany

[21] Appl. No.: 355,309

[22] Filed: Mar. 5, 1982

[30] Foreign Application Priority Data

Mar. 28, 1981 [DE] Fed. Rep. of Germany ....... 3112427

[51] Int. Cl.³ .......................... C09B 29/08; D06P 3/52
[52] U.S. Cl. ........................................... 8/639; 8/696; 8/922
[58] Field of Search .............................................. 8/639

[56] References Cited

U.S. PATENT DOCUMENTS 3,342,804  9/1967  Mueller .................................. 8/524
4,321,055  3/1982  Hansen et al. ......................... 8/639
4,329,148  5/1982  Hansen et al. ......................... 8/639

FOREIGN PATENT DOCUMENTS 54-156875 12/1979 Japan .
978544 12/1964 United Kingdom .
1148672  4/1969 United Kingdom .

Primary Examiner—A. Lionel Clingman

Attorney, Agent, or Firm—Oblon, Fisher, Spivak, McClelland & Maier

[57] ABSTRACT

Navy dye mixtures which contain, as essential components, compounds of the general formula I

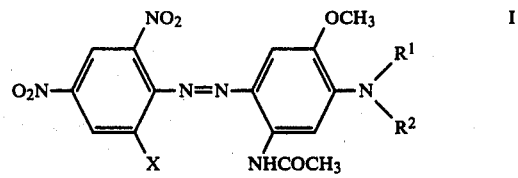

in the following amounts, based on the total weight of the mixture:

| | | | |
|---|---|---|---|
| X = Br | R¹ = C₂H₄CN | R² = CH₂CH=CH₂ | 39–49%, |
| X = Br | R¹ = C₂H₄CN | R² = H | 1–10%, |
| X = Br | R¹ = H | R² = CH₂CH=CH₂ | 4–16%, |
| X = Cl | R¹ = C₂H₄CN | R² = H | 15–25%, |
| X = Cl | R¹ = C₂H₄CN | R² = CH₂CH=CH₂ | 4–9%, |
| and | | | |
| X = Cl | R¹ = CH₂—CH(OH)—CH₂—O—C₄H₉(n) | R² = H | 4–10%. |

The novel mixtures are very useful for dyeing synthetic polyesters.

1 Claim, No Drawings

NAVY DYE MIXTURES

The present invention relates to dye mixtures which give navy dyeings.

According to the invention there is provided a dye mixture which contains, as essential components, compounds of the general formula I

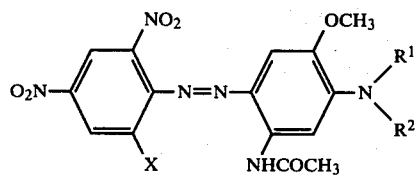

in the following amounts, based on the total weight of the mixture:

| | | | |
|---|---|---|---|
| X = Br | $R^1 = C_2H_4CN$ | $R^2 = CH_2CH=CH_2$ | 39–49%, |
| X = Br | $R^1 = C_2H_4CN$ | $R^2 = H$ | 1–10%, |
| X = Br | $R^1 = H$ | $R^2 = CH_2CH=CH_2$ | 4–16%, |
| X = Cl | $R^1 = C_2H_4CN$ | $R^2 = H$ | 15–25%, |
| X = Cl | $R^1 = C_2H_4CN$ | $R^2 = CH_2CH=CH_2$ | 4–9%, |
| and | | | |
| X = Cl | $R^1 = CH_2-\underset{OH}{CH}-CH_2-O-C_4H_9(n)$ | $R^2 = H$ | 4–10%. |

The novel mixture possesses excellent dyeing and finishing characteristics, and gives very fast navy dyeings on synthetic polyesters.

Features to be singled out are the high color strength, the temperature-independent affinity from 120° C. to 140° C., especially from 125° C. to 135° C., when the dyes are used in the high temperature process, and the low fixing temperature when the dyes are used in the thermosol process.

The novel mixture may be obtained either by mixing the individual components mechanically or by preparing mixtures separately, by mixed coupling using different diazo components, and then combining these.

In the Examples which follow, and illustrate the preparation and use of the dye mixture, parts and percentages are by weight, unless stated otherwise.

EXAMPLE 1

Dyes of the specified formulae are prepared separately in a conventional manner and are combined in a ball mill to give a dye mixture according to the invention.

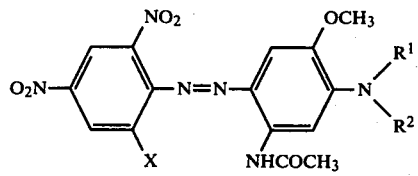

45 parts of the dye where X=Br, $R^1=C_2H_2CN$ and $R^2=CH_2CH=CH_2$, 7 parts of the dye where X=Cl, $R^1=C_2H_4CN$ and $R^2=CH_2CH=CH_2$, 8 parts of the dye where X=Br, $R^1=C_2H_4CN$ and $R^2=H$, 23 parts of the dye where X=Cl, $R^1=C_2H_4CN$ and $R^2=H$, 8 parts of the dye where X=Br, $R^1=H$ and $R^2=CH_2-CH=CH_2$, and 9 parts of the dye where X=Cl,

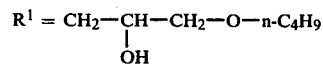

and $R^2=H$ are mixed mechanically to give 100 parts of a dye mixture according to the invention. The dye mixture gives very fast deep navy dyeings on synthetic polyesters.

EXAMPLE 2

(a) 480 parts of 2,4-dinitro-6-chloroaniline in 2,300 parts of concentrated sulfuric acid are diazotized with 715 parts of nitrosylsulfuric acid of about 42% strength, in a conventional manner.

(b) 123 parts of 3-(N-allyl-N-2'-cyanoethylamino)-4-methoxyacetanilide, 262 parts of 3-(N-2'-cyanoethylamino)-4-methoxyacetanilide and 209 parts of 3-(N-2'-hydroxy-3'-butoxypropylamino)-4-methoxyacetanilide are introduced into a mixture of 6,000 parts of water, 300 parts of concentrated sulfuric acid and 25 parts of amidosulfuric acid, and 9,000 parts of ice are added, after which the diazonium salt solution prepared as described in (a) is stirred in at 0° C. or below. After coupling is complete, the dye obtained is filtered off under suction at elevated temperature and washed neutral and salt-free with water. About 933 parts of a dye mixture are obtained, which essentially contains dyes of the general formula II

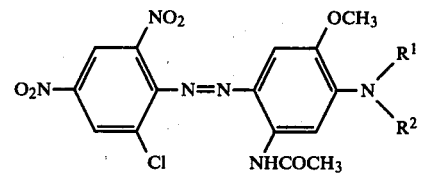

in the following amounts: about 510 parts of the dye where $R^1=C_2H_4CN$, and $R^2=H$, about 190 parts of the dye where $R^1=C_2H_4CN$ and $R^2=CH_2CH=CH_2$, and about 190 parts of the dye where

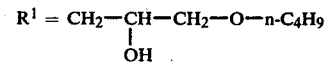

and $R^2=H$.

(c) 524 parts of 2,4-dinitro-6-bromoaniline in 2,100 parts of concentrated sulfuric acid are reacted with 650 parts of nitrosylsulfuric acid of about 42% strength.

(d) 412 parts of 3-(N-allyl-N-2'-cyanoethylamino)-4-methoxyacetanilide, 61 parts of 3-(N-allylamino)-4-methoxyacetanilide and 58 parts of 3-(N-2'-cyanoethylamino)-4-methoxyacetanilide are introduced into a mixture of 5,000 parts of water, 92 parts of concentrated sulfuric acid and 20 parts of amidosulfonic acid, 7,000 parts of ice are added, and thereafter the mixture is reacted, with stirring and at 0° C. or below, with the diazonium salt solution prepared as described in (c). 1,009 parts of a dye mixture are obtained, which essentially contains dyes of the general formula III

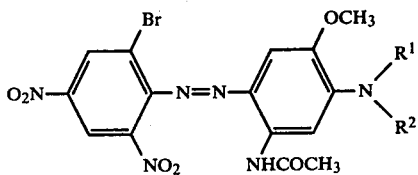

in the following amounts: about 750 parts of the dye where $R^1 = C_2H_4CN$ and $R^2 = CH_2CH=CH_2$, about 110 parts of the dye where $R^1 = C_2H_4CN$ and $R^2 = H$, and about 120 parts of the dye where $R^1 = H$ and $R^2 = CH_2CH=CH_2$.

(e) 40 parts of the dye mixture prepared as described in (b) are mixed mechanically in a ball mill with 60 parts of the dye mixture prepared as described in (d). 100 parts of a novel dye mixture which corresponds in chemical composition and coloristic properties to the mixture prepared in Example 1 are obtained.

3. DYEING EXAMPLE 1 (high temperature process)

100 parts of a polyester yarn are dyed in a bath containing 2,000 parts of water, 1.5 parts of the finely dispersed dye prepared as described in Example 1, and 2 parts of the product obtained by adduct formation of 80 mols of ethylene oxide with 1 mol of sperm oil alcohol and subsequent sulfonation of the adduct.

Dyeing is begun at 60° C., the temperature is increased to 125° C. in the course of 20 minutes, and dyeing is continued for a further 90 minutes at this temperature.

A very fast deep navy dyeing is obtained.

4. DYEING EXAMPLE 2 (thermosol process)

A polyester fabric is impregnated, on a two-bowl padding mangle, with a liquor which contains, per 1,000 parts, 25 parts of the finely dispersed dye prepared as described in Example (2e), 10 parts of a 20% strength aqueous solution of an acrylic acid/acrylamide copolymer, and 965 parts of water.

After impregnation to 60% wet pickup, the fabric is dried at 120° C. and then thermosoled for 45 seconds at 215° C. A very fast deep navy dyeing is obtained.

5. PRINTING EXAMPLE

A polyester fabric is printed with a paste which contains, per 1,000 parts, 40 parts of the finely dispersed dye prepared as described in Example (2e), 600 parts of a starch gum thickener, 20 parts of the reaction product of 1 mol of castor oil with 40 mols of ethylene oxide, 10 parts of triisobutyl phosphate and 330 parts of water.

The printed fabric is dried, and steamed for 15 minutes under a pressure of 1.5 atmospheres.

A very fast deep navy print is obtained.

We claim:

1. A dye mixture which contains, as essential components, compounds of the formula I

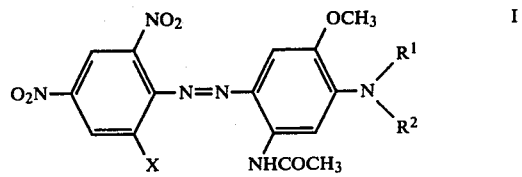

in the following amounts, based on the total weight of the mixture:

| | | | |
|---|---|---|---|
| X = Br | $R^1 = C_2H_4CN$ | $R^2 = CH_2CH=CH_2$ | 39–49%, |
| X = Br | $R^1 = C_2H_4CN$ | $R^2 = H$ | 1–10%, |
| X = Br | $R^1 = H$ | $R^2 = CH_2CH=CH_2$ | 4–16%, |
| X = Cl | $R^1 = C_2H_4CN$ | $R^2 = H$ | 15–25%, |
| X = Cl | $R^1 = C_2H_4CN$ | $R^2 = CH_2CH=CH_2$ | 4–9%, |
| and | | | |
| X = Cl | $R^1 = CH_2-CH(OH)-CH_2-O-C_4H_9(n)$ | $R^2 = H$ | 4–10%. |

* * * * *